UNITED STATES PATENT [19]

United States Patent [19]
Wood et al.

[11] 3,921,556
[45] Nov. 25, 1975

[54] SCORED REVERSE BUCKLING RUPTURE DISK MANUFACTURING METHOD

[75] Inventors: Loren E. Wood, Tulsa; John W. Reynolds, Bixby, both of Okla.

[73] Assignee: Black, Sivalls & Bryson, Inc., Tulsa, Okla.

[22] Filed: Jan. 2, 1975

[21] Appl. No.: 538,097

[52] U.S. Cl.............. 113/120 R; 72/60; 72/379; 113/116 B; 113/116 V; 113/116 QA; 220/89 A
[51] Int. Cl.² .......................................... B21D 51/00
[58] Field of Search .. 113/1 F, 15 A, 120 R, 116 R, 113/116 B, 116 V, 116 QA, 121 R, 121 A, 121 C; 72/54, 60, 379; 220/89 A; 137/68 R

[56] References Cited
UNITED STATES PATENTS
3,704,807 12/1972 Lidgard............................ 220/89 A
3,834,580 9/1974 Ludwig et al..................... 220/89 A Primary Examiner—Carl E. Hall
Attorney, Agent, or Firm—C. Clark Dougherty, Jr.

[57] ABSTRACT

The present invention relates to methods of manufacturing scored reverse buckling rupture disks whereby the disks are partially formed from sheet metal sections, annealed to relieve stresses therein, scores applied thereto, finally formed and then annealed a second time to relieve stresses therein.

17 Claims, 5 Drawing Figures

SCORED REVERSE BUCKLING RUPTURE DISK MANUFACTURING METHOD

BACKGROUND OF THE INVENTION

1. Field of the Invention

The present invention relates generally to methods of manufacturing scored reverse buckling rupture disks, and more particularly, but not by way of limitation, to methods of manufacturing scored reverse buckling rupture disks of desired reversal rupture pressure whereby in operation of the disks center reversal and full opening is assured.

2. Description of the Prior Art

Many various safety pressure relief devices of the rupture disk type have been developed. Generally these devices include a rupture disk supported between a pair of supporting members or flanges which are in turn connected to a relief connection in a vessel or system containing fluid pressure. When the pressure within the vessel or system exceeds the design rupture pressure of the disk, rupture occurs causing excess fluid pressure to be relieved from the vessel or system.

Recently rupture disks of the reverse buckling type have been developed which are capable of operating at 90% or more of the pressure at which the disk is designed to rupture. One such reverse buckling rupture disk assembly includes a reverse buckling concave-convex rupture disk supported between inlet and outlet supporting members with a set of knife blades positioned adjacent the disk in the outlet supporting member so that when a pressure level is reached in the vessel or system being protected exceeding the design rupture pressure of the disk, the concave-convex portion of the disk reverses itself and impales on the knife blades.

More recently reverse buckling rupture disks have been developed which include scores or grooves on a surface of the concave-convex portion thereof creating lines of weakness therein so that upon reversal of the disk the concave-convex portion tears along the lines of weakness and opens without fragmentation. Pressure relief devices including such scored reverse buckling rupture disks are described and claimed in U.S. Pat. No. 3,484,817 issued to Loren E. Wood on Dec. 16, 1969, which patent is assigned to the assignee of this present invention.

While safety pressure relief devices of the type described and claimed in U.S. Pat. No. 3,484,817 generally operate satisfactorily, problems have been encountered in certain applications of such devices, particularly where the rupture disk must reverse itself and open at relatively low pressures. For example, it has been found that heretofore used scored reverse buckling rupture disks upon reaching design rupture pressure sometimes reverse erratically, i.e., the reversal process starts at a side of the disk rather than from the center thereof resulting in only a partial opening of the disk. Further, it has been found that such rupture disks sometimes reverse but do not tear along the lines of weakness created by the scores therein thereby failing to relieve excess pressure from the system being protected. Moreover, it has been found that where some of the heretofore used scored reverse buckling rupture disks reverse but do not open, the fluid pressure required to rupture the disks in tension, particularly in low pressure applications, far exceeds the design rupture pressure of the disks thereby creating an extremely dangerous over pressure condition in the vessel or system intended to be protected by the rupture disks.

By the present invention a method of manufacturing scored reverse buckling rupture disks is provided whereby the operational problems described above are obviated. More specifically, a method of manufacturing scored reverse buckling rupture disks is provided whereby the disks produced have characteristics such that reversal from the center of the disks is insured and in the event the disks reverse without tearing along the lines of weakness created by the scores therein, the disks will rupture in tension at a pressure no greater than 1.5 times the design reversal pressure of the disks.

SUMMARY OF THE INVENTION

The present invention is directed to a method of manufacturing a group of scored reverse buckling rupture disks having a desired reversal rupture pressure from sheet metal comprising the steps of dividing the sheet metal into a plurality of sections, forming a portion of each of the sections in a concave-convex dome, annealing the sections to relieve stresses therein, forming scores in the concave-convex dome portion of each of the sections, reforming the concave-convex dome portion of each of the sections to increase the crown height of the dome portions, and then annealing the sections a second time to relieve stresses therein.

It is, therefore, an object of the present invention to provide a method of manufacturing a group of scored reverse buckling rupture disks whereby each of said disks has a known reversal rupture pressure.

A further object of the present invention is the provision of a method of manufacturing scored reverse buckling rupture disks whereby the disks produced reverse from the center of the concave-convex portion thereof and erratic buckling is prevented.

Yet a further object of the present invention is the provision of a method of manufacturing scored reverse buckling rupture disks whereby the disks produced rupture in tension at a pressure no greater than 1.5 times the reversal rupture pressure of the disks.

Other and further objects, features and advantages of the invention will be apparent from the following description of the presently preferred embodiments, given for the purpose of disclosure, and taken in conjunction with the accompanying drawings.

DESCRIPTION OF THE PREFERRED EMBODIMENTS

Figure 1:
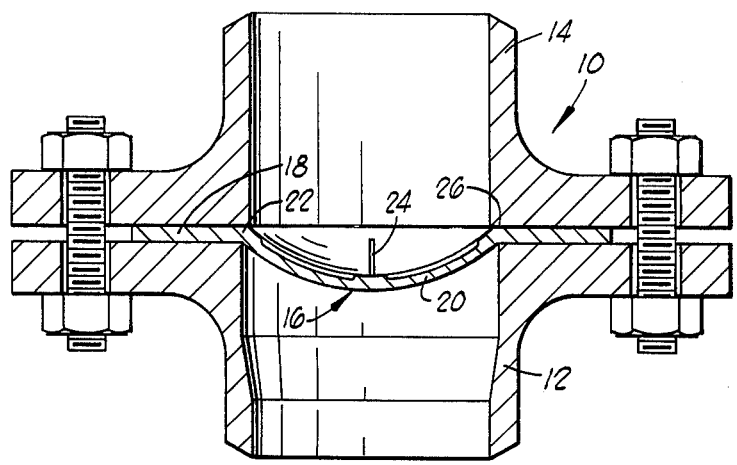
FIG. 1 is a side elevational view of a safety pressure relief device including a reverse buckling scored rupture disk taken in cross-section.
Figure 2:
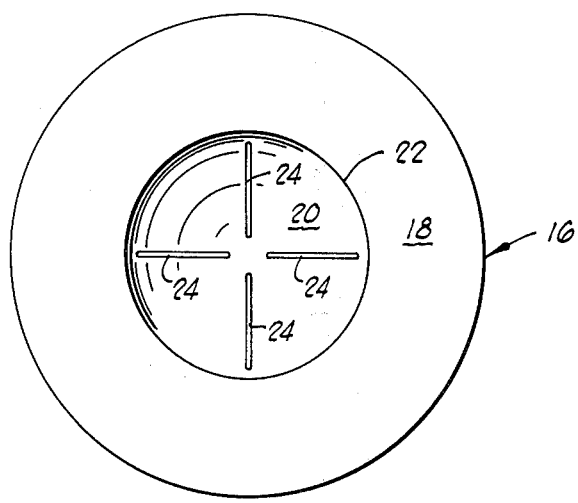
FIG. 2 is a top plan view of the scored reverse buckling rupture disk of FIG. 1.
Figure 3:
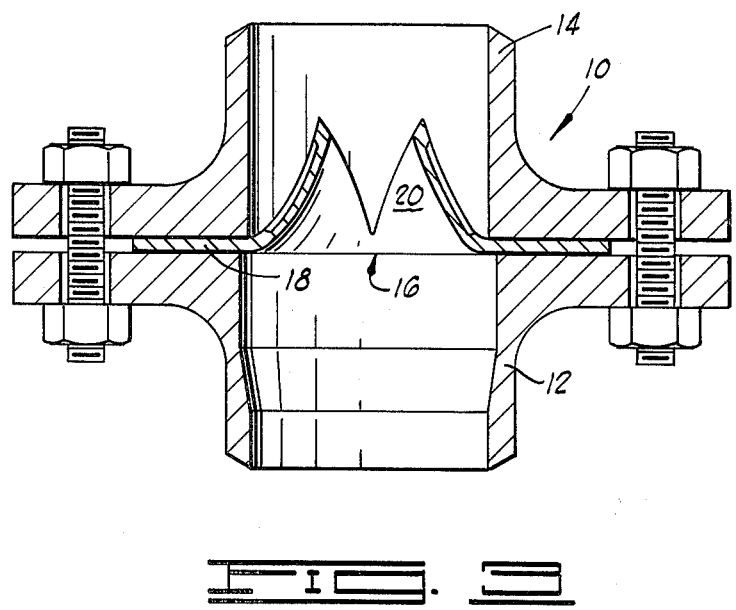
FIG. 3 is a sectional side elevational view of the safety pressure relief device of FIG. 1 after reversal and rupture of the reverse buckling rupture disk thereof.

Referring now to the drawings and particular to FIGS. 1–3, a safety pressure relief device including a scored reverse buckling rupture disk is illustrated and generally designated by the numeral 10. The device 10 is basically comprised of inlet and outlet flange type supporting members 12 and 14, respectively, with a scored reverse buckling rupture disk 16 clamped therebetween. As will be understood by those skilled in the art the supporting members 12 and 14 can take a variety of forms other than that shown in the drawings and described herein for purposes of disclosure, e.g., the device 10 can include special cylindrical supporting members which are clamped between conventional pipe or other flanges. Accordingly, this invention is not to be limited to any particular form of supporting members. In whatever form the supporting members 12 and 14 take, the inlet supporting member 12 is sealingly communicated with a vessel or system to be protected so that fluid pressure exerted within the vessel or system is communicated to the convex side of the rupture disk 16. The outlet supporting member 14 can be connected to a system for disposing of fluids relieved through the device 10 or can be left open to the atmosphere.

The scored reverse buckling rupture disk 16 includes a flat annular flange portion 18 connected to a concave-convex dome portion 20 by a transition connection 22. A plurality of grooves 24, referred to in the art as "scores" are disposed in the concave side of the concave-convex dome portion 20 creating lines of weakness therein. The scores 24 radiate outwardly from the center of the concave-convex dome portion 20 towards the periphery thereof. As is further well understood by those skilled in the art, the rupture disk 16 can take a variety of forms other than that illustrated in the drawings and described above. For example, the annular flat flange portion 18 can be omitted and the entire disk 16 formed of concave-convex shape. Further, the scores 24 can be disposed in the disk 16 on either the concave or convex surface thereof and more or less than four scores can be utilized radiating outwardly from the center of the concave-convex portion towards the periphery thereof, or a single score can be utilized defining a circular or other area on a surface of the concave-convex portion of the disk. A presently preferred embodiment of the scored reverse buckling rupture disks manufactured in accordance with the methods of the present invention includes the annular flat flange portion 18 connected to the concave-convex portion 20 by the transition connection 22 with four scores 24 disposed in the concave surface of the concave-convex portion radiating outwardly from the center thereof so that the lines of weakness created by the scores 24 divide the concave-convex portion of the disk 16 into quadrants.

As shown in FIGS. 1 and 3, the transition connection 22 of the rupture disk 16 is preferably supported by an inwardly extending annular shoulder 26 provided by the outlet supporting member 14 which prevents premature reverse buckling thereof. In operation of the safety pressure relief device 10, when the fluid pressure exerted on the convex surface of the disk 16 exceeds the reversal rupture pressure of the disk, the disk reverses itself and tears along the lines of weakness created by the scores 24 so that the disk opens in a four petal configuration as shown in FIG. 3.

The methods of the present invention for manufacturing a group of scored reverse buckling rupture disks having a known reversal rupture pressure from sheet metal include the steps of dividing the sheet metal into a plurality of sections, forming a concave-convex dome in each of the sheet metal sections, annealing the sheet metal sections to relieve stresses therein, forming scores in the concave-convex domes of each of the sheet metal sections, reforming the concave-convex domes so that the crown heights thereof are increased, and then annealing the sections a second time to relieve stresses therein. The reforming and annealing steps of the invention result in the production of a group of rupture disks having constant reversal rupture pressures, i.e., each of the disks so produced reverse at substantially the same fluid pressure level, and allow the ratio of tension rupture pressure to reversal rupture pressure of each of the disks to be controlled at a desired value as will be described further hereinbelow.

The term "tension rupture pressure" is used herein to mean the fluid pressure exerted on the concave side of the concave-convex dome portion of a scored reverse buckling rupture disk required to cause the disk to rupture. The term "reversal rupture pressure" is used herein to mean the fluid pressure exerted on the convex side of the concave-convex dome portion of a scored reverse buckling rupture disk required to cause the concave-convex dome portion to reverse itself and tear along the lines of weakness created therein by the scores. The term "unscored tension rupture pressure" is used herein to mean the fluid pressure exerted on the concave side of the concave-convex portion of a disk prior to scoring the disk required to cause the concave-convex dome portion to rupture. The term "crown height" is used herein to mean the distance from the apex of the concave-convex dome portion of a rupture disk to the horizontal plane of the peripheral portions of the disk.

In a presently preferred method of manufacturing a group of scored reverse buckling rupture disks having a known reversal pressure from sheet metal, the sheet metal is first divided into a plurality of circular sections or disks of a diameter adapted to fit between the particular size of supporting members to be utilized with the rupture disks produced. The sections are then each clamped between a pair of special supporting members for forming concave-convex dome portions therein connected to a source of pressurized fluid, such as pressurized air. A concave-convex dome portion is formed in each of the sections by applying fluid pressure on one side thereof at a level exceeding the yield point of the metal from which the sections are formed. The initial forming step is controlled so that the concave-convex dome formed in each of the sheet metal sections or disks has a crown height substantially equal to 13% of the diameter of the disk. This crown height is commonly known in the art as a 40% crown height meaning that the disk is bulged using a fluid pressure equal to 40% of the fluid pressure required to cause the disk to burst or rupture, i.e., 40% of the unscored tension rupture pressure.

After each of the disks are initially formed in the manner described above, they are subjected to an annealing step to relieve stresses therein. That is, the disks are heated and allowed to cool slowly so that stresses set up in the metal as a result of forming the dome portion therein are relieved.

Figure 4:
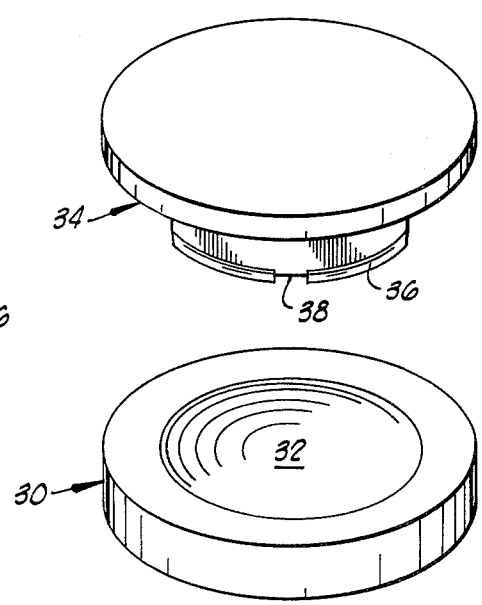
FIG. 4 is a perspective view of presently preferred apparatus which is utilized in accordance with the present invention for forming the scores in scored reverse buckling rupture disks.

After the annealing step has been carried out on the disks, scores are formed in the concave-convex dome portions thereof using special scoring apparatus. That is, referring to FIG. 4, a cylindrical anvil 30 is provided having a concave depression 32 disposed in the flat upper face thereof. The depression 32 is of a shape and depth substantially corresponding to the shape of the convex surface of the concave-convex dome portion of the metal disks formed to a 40% crown height as described above. As will be understood, rupture disks are manufactured in standard sizes, and an anvil 30 is provided for each standard size having a depression 32 therein corresponding with the concave-convex dome portion of a standard size disk formed to a 40% crown height.

A special blade member 34 is provided for cooperating with each of the anvils 30 and forming scores in the concave side of the concave-convex dome portions of the disks. The blade member 34 includes a sharpened convex shaped blade 36 having a curvature slightly smaller than the curvature of the concave depression 32 in the anvil 30. The center portion of the blade 36 includes a cutout section or notch 38 so that when the blade 36 contacts the concave surface of a disk, two of the scores 24 are impressed into the disk leaving an unscored section at the center of the disk. In operation of the anvil 30 and blade member 34, a disk to be scored is placed on the anvil 30 with the convex surface of the concave-convex dome portion thereof fitted into the concave depression 32. The blade member 34 is then lowered into forcible contact against the concave surface of the disk so that two of the scores 24 are formed therein. The anvil member 30 is then rotated 90° and the blade member 34 caused to again forcibly contact the concave surface of the disk to form two additional scores 24 therein in the configuration shown in FIG. 2. As will be understood, the anvil 30 provides a backup for the blade 36 when it contacts the disk being scored. Further, the blade member 34 is connected to a press or other similar apparatus whereby the depth of the scores 24 impressed into the disk can be accurately controlled. Because the curvature of the blade 36 of the member 34 is slightly smaller than the curvature of the depression 32 in the anvil 30, the scores formed thereby are deeper at the center portion of the concave-convex dome of the disk than at the periphery thereof. The notch 38 provided in the blade 36 leaves an unscored portion at the center of the disk so that the scores 24 do not intersect and weaken the disk ununiformly. The blade member 34 can include a variety of blade configurations depending upon the particular score configurations to be formed in the disks being manufactured. For example, the blade member 34 can include a pair of blades 36 positioned perpendicularly to each other, intersecting at the centers thereof and including a notch or cutout section at the point of intersection so that four scores radiating outwardly from the center of the disk are formed therein in one step.

After the group of metal disks have been scored, one or more of the disks are again clamped into the dome forming supporting members described above and increasing fluid pressure applied on the concave side of the concave-convex dome portions thereof until the dome portions rupture thereby determining the tension rupture pressure of the disks. Once the tension rupture pressure of the disks is determined, the remaining disks are each clamped into the dome forming supporting members and fluid pressure applied on the concave sides thereof at a level below the tension rupture pressure so that the dome portions of the disks are reformed, i.e., the crown heights increased. Preferably, the fluid pressure applied in the reforming step is equal to from about 85 to about 95% of the tension rupture pressure of the disks. This reforming step stresses the metal of the disks and increases the reversal rupture pressure thereof. The reformed disks are next subjected to a second annealing step to relieve stresses therein which lowers the reversal rupture pressure thereof. Thus, the steps of reforming and annealing the disks changes the reversal rupture pressure and tension rupture pressure of the disks and lowers the ratio of tension rupture pressure to reversal rupture pressure.

After the second annealing step is carried out on the disks, one or more of the disks are placed in the dome forming supporting members described above and increasing fluid pressure applied to the convex side thereof until the concave-convex portion of the disk reverses itself and ruptures thereby determining the reversal rupture pressure of the disks.

In order to insure that the disks manufactured in accordance with the method of the invention have a tension rupture pressure such that if the disks reverse but do not open excessive pressure will not be required to rupture the disks in tension, the ratio of tension rupture pressure to reversal rupture pressure of the disks is controlled at a value of 1.5 or less. Since under applicable pressure vessel and piping codes the test pressure of pressure vessels and systems is set at 1.5 times the design pressure of such vessels and systems, it is desirable that scored reverse buckling rupture disks utilized with such vessels and systems have a reversal rupture pressure close to the design pressure and a tension rupture pressure no higher than 1.5 times the reversal rupture pressure. This insures that if such disks reverse without rupturing, rupture will ultimately occur before the pressure level within the vessel or system exceeds the test pressure thereof.

Figure 5:
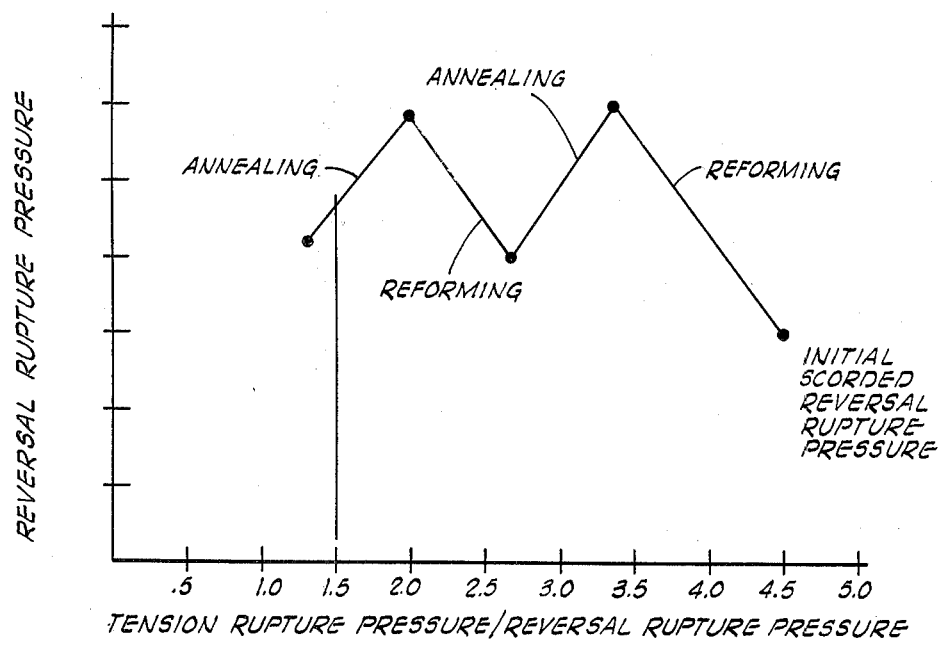
FIG. 5 is a graph illustrating the effect of the reforming and annealing steps of the present invention on the tension rupture pressure to reversal rupture pressure ratio of the disks produced.

In accordance with the method of the present invention, if the ratio of tension rupture pressure to the reversal rupture pressure of the disks manufactured in the manner described above is greater than 1.5, the steps of reforming the disks and annealing the disks are repeated and the resulting decreased ratio of tension rupture pressure to reversal rupture pressure determined. Referring specifically to FIG. 5, a graph is presented showing the effects of repeating the reforming and annealing steps. Each time the disks are reformed the reversal rupture pressure is increased and when the disks are annealed the reversal rupture pressure is decreased resulting in a lowering of the ratio of tension rupture pressure to reversal rupture pressure. The reforming and annealing steps can be repeated a number of times required to lower the tension rupture pressure-reversal rupture pressure ratio to a value of 1.5 or less. Once a ratio of 1.5 or less is achieved for one or more of the disks being manufactured, the remaining disks in the group are subjected to the same number of reforming and annealing steps at the same conditions so that a group of scored reverse buckling rupture disks having a known reversal rupture pressure and a ratio of tension rupture pressure to reversal rupture pressure of 1.5 or less are manufactured.

In carrying out the first annealing step in accordance with this invention, the disks are preferably heated to a temperature in the range of from about 1350°F to about 2000°F for a time period in the range of from about 5 minutes to about 15 minutes and then allowed to cool to room temperature. In carrying out the second and subsequent annealing steps utilized, the disks are preferably heated to a temperature in the range of from about 1500°F to about 2000°F for a period of time in the range of from about 2 minutes to about 5 minutes. At these temperatures and times, stresses set up in the disks are relieved, but the grain structure of the metal is not changed significantly.

As mentioned above, the annealing steps of this invention, and resultant relief of stresses set up in the metal disks, insures that each of the disks manufactured in a particular group have substantially the same tension and reversal rupture pressure characteristics. The particular temperature and time requirements for annealing disks formed of various metals to accomplish the desired results have been found to vary within the ranges given above. Table I below presents temperature and time requirements for annealing disks formed from various metals which have been found to achieve particularly suitable results.

TABLE I

ANNEALING STEP TEMPERATURE AND TIME REQUIREMENTS

| Annealing Step | Metal | Temperature °F | Time, Min. |
|---|---|---|---|
| First | Nickel | 1350 | 8 |
| | Stainless Steel | 2000 | 15 |
| | Nickel-Copper Alloys | 1600 | 8 |
| | Nickel-Chromium Alloys | 1900 | 5 |
| Second and Subsequent | Nickel | 1500 | 5 |
| | Stainless Steel | 2000 | 2 |
| | Nickel-Copper Alloys | 1600 | 5 |
| | Nickel-Chromium Alloys | 1900 | 5 |

As will be understood by those skilled in the art, the particular tension and reversal rupture pressure characteristics of scored reverse buckling rupture disks vary with a great number of variables such as the size of the disks, the thickness of sheet metal employed, the particular metal from which the disks are formed, the crown height of the concave-convex dome portions, the configuration and depth of the scores, etc. In carrying out the methods of the present invention for manufacturing scored reverse buckling rupture disks of desired reversal rupture pressure, trial and error techniques are employed to determine the thickness of sheet metal required, etc. That is, sections of sheet metal formed of the particular metal required and cut into the required size, are placed into the dome forming supporting members described above and increasing fluid pressure applied thereto until rupture occurs so that the unscored tension rupture pressures for various thickness of sheet metal are determined. From this information a thickness of sheet metal is determined having an unscored tension rupture pressure approximately 2.25 to 5 times the desired reversal rupture pressure of the scored reverse buckling rupture disks to be manufactured. Sheet metal of approximately this thickness is then divided into sections, concave-convex dome portions formed therein and the first annealing step described above carried out thereon. At this point a group of the metal sections or disks are scored in the manner described above to a known depth such that the tension rupture pressure of the scored disks is in the range of from about 10 to about 50% of the unscored tension rupture pressure. At a tension rupture pressure of 10% of the unscored tension rupture pressure it has been found that pin holes result in the disks. At a tension rupture pressure over 50% of the unscored rupture pressure it has been found that the resulting disks often will not open after reversal. Preferably, the disks are scored so that the tension rupture pressure thereof lies in the range of from about 20 to about 45% of the unscored tension rupture pressure. The resultant scored group of disks are reformed by applying a fluid pressure on the concave side of the concave-convex dome portions thereof at a level below the tension rupture pressure of the disks, preferably at a pressure level in the range of from about 85 to about 95% of the tension rupture pressure. The reformed disks are then annealed in the manner described above and the reversal rupture pressure determined. If the reversal rupture pressure obtained is too low or too high, the process is repeated on additional groups of disks with the depth of scores formed therein being decreased or increased until a reversal rupture pressure is obtained approximately equal to the desired reversal rupture pressure. Upon obtaining the desired reversal rupture pressure, if the ratio of tension rupture pressure to reversal rupture pressure is above 1.5, the disks are reformed by again applying fluid pressure to the concave side of the concave-convex dome portions thereof at a level within the range of from about 85 to about 95% of the tension rupture pressure followed by a third annealing step which brings about a decrease in the tension rupture pressure-reversal pressure ratio without substantially changing the reversal rupture pressure. If necessary, the steps of reforming and annealing are repeated until a ratio of tension rupture pressure to reversal rupture pressure of 1.5 or less is obtained. Once this is accomplished, the remaining domed sections of sheet metal previously subjected to the first annealing step are scored to the depth which resulted in the approximate desired reversal rupture pressure, slightly increased or decreased to adjust the reversal rupture pressure to a level as close to the desired reversal rupture pressure as possible, and reformed and annealed the number of times and at the conditions which resulted in a tension rupture pressure to reversal rupture pressure ratio of 1.5 or less thereby manufacturing a group of scored reverse buckling rupture disks of desired reversal rupture pressure and having a tension rupture pressure to reversal rupture pressure ratio of 1.5 or less.

Thus, the present invention is well adapted to carry out the objects and attain the ends mentioned as well as those inherent therein. While presently preferred embodiments of this invention have been described for purposes of this disclosure, numerous changes in the order of steps and configuration of rupture disks produced will suggest themselves to those skilled in the art, which changes are encompassed within the spirit of this invention and lawful scope of the appended claims.

What is claimed is:

1. A method of manufacturing a group of scored reverse buckling rupture disks of desired reversal rupture pressure from sheet metal comprising the following steps performed in the order recited:
   a. dividing said sheet metal into a plurality of sections;
   b. forming a concave-convex dome in each of said sheet metal sections;

c. annealing said sheet metal sections to relieve stresses therein;

d. forming scores on a surface of said concave-convex dome portions of said sheet metal sections thereby creating lines of weakness therein;

e. reforming said concave-convex dome portions of said sheet metal sections to increase the crown heights thereof; and f. annealing said sheet metal sections a second time to relieve stresses therein.

2. The method of claim 1 wherein said scores formed in said sheet metal sections in accordance with step (d) are of the same depth and configuration in each of said sections.

3. The method of claim 2 wherein said scores formed in each of said sheet metal sections are of a character such that the concave-convex dome portions of said sections have less ability to resist reversal at the center portions thereof than at the peripheral portions thereof.

4. The method of claim 2 wherein said scores radiate outwardly from the center of said concave-convex dome portions of said sheet metal sections towards the peripheries thereof.

5. The method of claim 4 wherein said scores are deeper at the centers of said concave-convex dome portions of said sheet metal sections than at the peripheries thereof.

6. A method of manufacturing a group of scored reverse buckling rupture disks having a known reversal rupture pressure from sheet metal comprising the following steps performed in the order recited:

a. dividing said sheet metal into a plurality of sections;

b. forming a concave-convex dome in each of said sheet metal sections by applying fluid pressure on a circular area of one surface thereof;

c. annealing said sheet metal sections to relieve stresses therein;

d. forming identical scores in said concave-convex dome portion of each of said sheet metal sections, said scores radiating outwardly from a central portion of said concave-convex dome towards the periphery thereof;

e. applying increasing fluid pressure on the concave side of said concave-convex dome portion of one or more of said sheet metal sections until said dome portion ruptures thereby determining the tension rupture pressure of said sections;

f. applying fluid pressure on the concave side of the concave-convex dome portion of each of the remaining of said sheet metal sections at a level below said tension rupture pressure so that the crown height of said dome portion is increased;

g. annealing said sheet metal sections a second time to relieve stresses therein; and h. applying increasing fluid pressure on the convex side of the concave-convex dome portion of one or more of said sheet metal sections until said dome portion reverses itself and ruptures thereby determining the reversal rupture pressure of said sections.

7. The method of claim 6 which is further characterized to include the step of repeating steps (f) and (g) on said sheet metal sections until the ratio of said tension rupture pressure to said reversal rupture pressure is equal to or less than 1.5

8. The method of claim 7 wherein said scores formed in each of each sheet metal sections in accordance with step (d) are formed in a manner such that said scores are deeper at the center of the dome portion of said section than at the periphery thereof.

9. The method of claim 8 wherein the fluid pressure applied in accordance with step (f) is at a level in the range of from about 85 to about 95% of said tension rupture pressure.

10. The method of claim 9 which is further characterized to include the steps of applying increasing fluid pressure on the concave side of said concave-convex dome portion of one or more of said sheet metal sections after carrying out step (c) thereon until said dome portion ruptures thereby determining the unscored tension rupture pressure of said sections; and forming said scores in accordance with step (d) so that said scores have a configuration and depth such that the tension rupture pressure of the resulting scored sheet metal sections is in a range of from about 10 to about 50% of said unscored tension rupture pressure.

11. The method of claim 10 wherein the annealing of said sheet metal sections in accordance with step (c) comprises heating said sheet metal sections to a temperature in the range of from about 1350°F to about 2000°F for a period of time in the range of from about 5 minutes to about 15 minutes.

12. The method of claim 11 wherein the annealing of said sheet metal sections in accordance with step (g) comprises heating said sheet metal sections to a temperature in the range of from about 1500°F to about 2000°F for a period of time in the range of from about 2 minutes to about 5 minutes.

13. A method of manufacturing a group of scored reverse buckling rupture disks having a known reversal rupture pressure from sheet metal comprising the following steps performed in the order recited:

a. dividing said sheet metal into a plurality of sections;

b. forming a portion of each of said sheet metal sections into a concave-convex dome by applying fluid pressure on a circular area of one surface thereof;

c. annealing said sheet metal sections to relieve stresses therein;

d. forming identical scores in the concave side of each of said concave-convex dome portions of a group of said sheet metal sections, said scores being of a known depth and radiating outwardly from a central portion of said concave-convex dome portion towards the periphery thereof;

e. applying increasing fluid pressure on the concave side of said concave-convex dome portion of one or more of said group of scored sheet metal sections until said dome portion ruptures thereby determining the tension rupture pressure of said sections;

f. applying fluid pressure on the concave side of the concave-convex dome portion of the remaining of said group of scored sheet metal sections at a level in the range of from about 85 to about 95% of said tension rupture pressure;

g. annealing said scored sheet metal sections a second time to relieve stresses therein;

h. applying increasing fluid pressure on the convex side of the concave-convex dome portion of one or more of said scored sheet metal sections until said dome portion reverses itself and ruptures thereby determining the reversal rupture pressure of said sections;

i. repeating steps (d) through (h) on additional groups of said sheet metal sections while varying the depth of said scores formed in accordance with step (d) until a desired reversal rupture pressure is obtained in step (h); and then j. carrying out steps (d), (f) and (g) on each of the remaining sheet metal sections using the depth of scores in step (d) which resulted in said desired reversal rupture pressure thereby manufacturing a group of scored reverse buckling rupture disks of desired reversal rupture pressure.

14. The method of claim 13 which is further characterized to include the steps of repeating steps (f), (g), and (h) on one or more of said group of scored sheet metal sections until the ratio of said tension rupture pressure to said reversal rupture pressure is equal to or less than 1.5 and repeating steps (f) and (g) on each of the remaining sheet metal sections a number of times equal to the number of times such steps were repeated to obtain said ratio of 1.5 or less so that a group of scored reverse buckling rupture disks of desired reversal rupture pressure and having a tension rupture pressure to reversal rupture pressure ratio of 1.5 or less is manufactured.

15. The method of claim 14 wherein said scores formed in said rupture disks in accordance with step (d) are formed in a manner such that said scores are deeper at the center of the dome portion than at the periphery thereof.

16. The method of claim 15 wherein the annealing of said sheet metal sections in accordance with step (c) comprises heating said sheet metal sections to a temperature in the range of from about 1350°F to about 2000°F for a period of time in the range of from about 5 minutes to about 15 minutes.

17. The method of claim 16 wherein the annealing of said sheet metal sections in accordance with step (g) comprises heating said sheet metal sections to a temperature in the range of from about 1500°F to about 2000°F for a period of time in the range of from about 2 minutes to about 5 minutes.

\* \* \* \* \*